May 8, 1923.
L. W. MURPHY
1,454,758
LOCKING JOINT
Filed Dec. 7, 1921
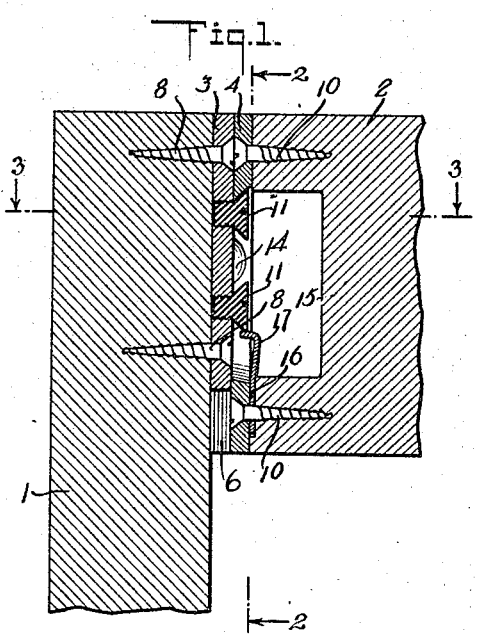
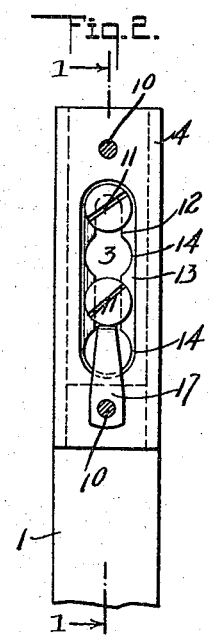
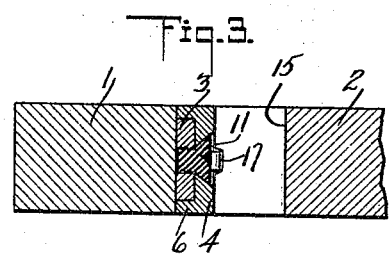
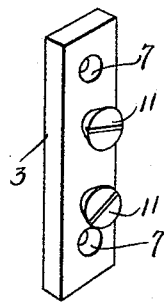
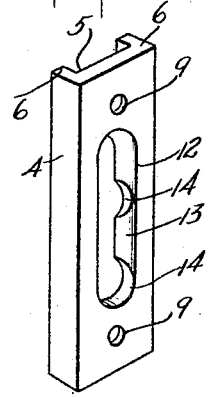
WITNESSES
Frederick Diehl.
F. J. Foster
INVENTOR
L. W. MURPHY
BY
ATTORNEYS Patented May 8, 1923.

1,454,758

UNITED STATES PATENT OFFICE.

LAWRENCE W. MURPHY, OF WEST HAVEN, CONNECTICUT.

LOCKING JOINT.

Application filed December 7, 1921. Serial No. 520,565.

*To all whom it may concern:*

Be it known that I, LAWRENCE W. MURPHY, a citizen of the United States, and a resident of West Haven, in the county of New Haven and State of Connecticut, have invented a new and Improved Locking Joint, of which the following is a full, clear, and exact description.

This invention relates to improvements in locking joints, an object of the invention being to provide a joint of this character which will take the place of the ordinary mortise and tenon or dowel joint, and in fact which may be utilized in practically any place where it is expedient to join the ends of two members together in angular relationship.

A further object of this invention is to provide a locking joint which will save a great deal of time in various forms of construction, and one which is particularly adapted for use with screen frames and similar structures.

Still another object of the invention is to provide a locking joint which will be simple and practical in construction, strong, durable and efficient in use, comparatively inexpensive to manufacture, and a joint so constructed that the interlocking members will be concealed in the assembled device.

With these and other objects in view, the invention consists in certain novel features of construction and combinations and arrangements of parts as will be more fully hereinafter described and pointed out in the claims.

In the accompanying drawings:

Figure 1 is a view in section through the corner of a screen frame or other frame taken on the line 1—1 of Figure 2;

Figure 2 is a view in section on the line 2—2 of Figure 1;

Figure 3 is a sectional view on the line 3—3 of Figure 1; and

Figures 4 and 5 are perspective views of the two interlocking plates.

Referring in detail to the drawings, I have used the reference numerals 1 and 2 to designate the two adjacent sections of a screen frame which are to be joined together. It is to be understood, however, at the outset that the showing of a screen frame is purely arbitrary and that the joint might be utilized with any two blocks or other pieces of material which are to be joined. The coupling or joining of the two frame sections is accomplished by the use of a pair of interlocking plates which I have indicated at 3 and 4, respectively, the plate 4 being appreciably longer than the plate 3. The plate 4 is channeled, as indicated at 5 to provide a pair of flanges 6 at its edge which straddle and conceal the plate 3.

It will be noted that the plate 3 is provided adjacent each end with an opening 7 and that these openings are enlarged and tapered adjacent the outer face of the plate to conveniently accommodate the heads of screws or similar securing devices 8. These screws are passed through the openings and utilized to secure the plate against the frame section 1 and the peculiar shape of the openings in the plate allows the head of the screw to come flush with the outer face of the plate. The plate 4 in like manner is also provided with openings 9 similar to the openings 7 in the plate 3 and securing devices 10 passed through the openings 9 are flush with the outer face of the plate 4 and serve to secure the same to the frame section 2. The plate 4 is secured to the frame section with the flanges 6 presented outwardly so that they may straddle the plate 3 when the frame sections are brought together.

Adjacent its intermediate portion a pair of screws having tapered heads 11 are fixed to the outer face of the plate 3. A relatively long slot 12 in the plate 4 includes tapered walls, indicated at 13 adapted to conveniently accommodate the heads of the screws 11. Circular recesses 14 are provided in the walls of the slot 12 to permit the passage of the screws 11. The slot 12 in fact is substantially the same as a pair of communicating key hole slots.

A recess or pocket 15 is provided in the frame section 2 directly under the slot 12 in the plate 4 and the frame section is also recessed as indicated at 16 directly under one end of the plate 4. One end of a spring 17 is secured in the slot 16 by one of the screws 10 passing therethrough.

The operation of the locking device is as follows: In joining the two frame sections, the studs 11 are passed through the openings 14 in the slot 12 and the frame sections are moved relative to one another until the heads of the screws are engaged by the narrow or restricted portions of the walls of the slot 12. The engagement of one of the screws 11 with the end of the slot 12 limits this movement and at the same time the spring 17 springs into place under the other screw 11 and holds the two plates against relative movement in either direction. The flanges 6 serve to conceal the plate 3 and also the interlocking devices so that a very neat joint is had.

It is to be understood that the joint may be used either as a face joint, as shown, or may be used as a concealed countersunk locking device. Studs might be substituted for the screws 11, but the screws are more desirable since they are adjustable to assure the proper interlocking of the device.

Although I have illustrated one of the preferred embodiments of my invention, it will be evident that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. A joint device of the character described, comprising a pair of members, one of said members movable longitudinally relative to the other, one member of general channel shape and the other member movably fitting within the channel and of a thickness corresponding to the depth of the flanges of the channel, said channel member having a longitudinal slot therein, the longitudinal walls thereof being tapered, said tapered walls having opposed recesses constituting an entrance, and a stud on the other member adapted to be projected through the entrance and having a taper corresponding to the taper of the walls of the slot whereby when the stud is in the slot and one member moved longitudinally relative to the other the two members may be locked together.

2. A joint device of the character described, comprising a pair of members, one member of general channel shape and the other member adapted to fit between the flanges of the channel member, said channel member having a longitudinal slot therein, the longitudinal walls of which are beveled and have stud entrances at one end of the slot and at a point intermediate the ends of the slots, a pair of spaced studs on the other of said members adapted to be projected through the entrances and having a taper corresponding to the taper of the walls of the slot whereby when said studs are in the slot and one member is moved longitudinally relative to the other the members may be locked together, and a spring carried by the channel member and adapted to engage one of the studs to hold the members against independent longitudinal movement.

LAWRENCE W. MURPHY.